United States Patent
Sebih et al.

(10) Patent No.: US 10,637,741 B2
(45) Date of Patent: Apr. 28, 2020

(54) INSTANCE USAGE FACILITATING SYSTEM

(71) Applicant: Hitachi, Ltd., Tokyo (JP)

(72) Inventors: Nazim Sebih, Tokyo (JP); Junji Kinoshita, Tokyo (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 16/192,835

(22) Filed: Nov. 16, 2018

(65) Prior Publication Data

US 2019/0158362 A1  May 23, 2019

(30) Foreign Application Priority Data

Nov. 20, 2017  (JP) ................................. 2017-222764

(51) Int. Cl.
| | |
|---|---|
| *H04L 12/24* | (2006.01) |
| *H04L 12/58* | (2006.01) |
| *H04L 29/08* | (2006.01) |
| *G06N 20/00* | (2019.01) |
| *H04L 12/26* | (2006.01) |

(52) U.S. Cl.
CPC .......... *H04L 41/14* (2013.01); *G06N 20/00* (2019.01); *H04L 41/16* (2013.01); *H04L 43/0817* (2013.01); *H04L 51/02* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 8,880,687 B1 | 11/2014 | Chandrachari et al. | |
| 2015/0244812 A1* | 8/2015 | Brunson | H04L 67/141 |
| | | | 709/203 |
| 2015/0286492 A1 | 10/2015 | Breitgand et al. | |
| 2016/0139948 A1 | 5/2016 | Beveridge et al. | |
| 2018/0247648 A1* | 8/2018 | Nadimpalli | G10L 15/22 |
| 2018/0285595 A1* | 10/2018 | Jessen | G06F 21/6245 |

OTHER PUBLICATIONS

Kee Kim, et al, "A Supervised Learning Model for Identifying Inactive VMs in Private Cloud Data Centers", In Proceedings of the Industrial Track of the 17th International Middleware Conference Article No. 2, Middleware Industry 16, Trento, Italy, Dec. 12-16, 2016.
Great Britain Office Action received in corresponding Great Britain Application No. 1818373.1 dated Apr. 30, 2019.

* cited by examiner

*Primary Examiner* — Scott B Christensen (74) *Attorney, Agent, or Firm* — Mattingly & Malur, PC (57) ABSTRACT

An object of the invention is to provide an instance usage facilitating system that finds an idle instance and makes the instance usable promptly and certainly. An instance usage facilitating system of the present invention is a system that detects an idle instance from among plural instances and makes the instance usable and includes a metrics acquisition unit, an instance selecting unit which selects an instance whose operating status should be inquired from among instances whose operating status is unknown, an inquiry unit which makes an inquiry of a user about the operating status of an instance and attaches a label indicating any of active, idle, and unknown statuses to the instance, an instance usage enabling unit which enables usage of an idle instance among labeled instances, and a machine learning unit which performs machine learning to determine the operating status of a new instance, using acquired metrics and labels.

4 Claims, 11 Drawing Sheets

| INSTANCE ID | SAMPLE DATE | CPU TIME | MEM UNUSED | RESIDENT MEM | DISK WRITE BYTES | DISK READ BYES | DISK WRITE I/O | DISK READ I/O | PACKET TRANSMIT BYTES | PACKET RECEIVE BYTES | PACKET TRANSMIT PACKETS | PACKET RECEIVE PACKETS |
|---|---|---|---|---|---|---|---|---|---|---|---|---|
| A | March 23rd 2017, 21:42:00.000 | 770 | 50 | 49 | 80 | 0 | 14 | 0 | 15916 | 18360 | 166 | 166 |
| B | March 23rd 2017, 21:42:00.000 | 111750 | 27 | 100 | 50179 | 328 | 4671 | 25 | 17976 | 71864 | 230 | 1040 |
| C | March 23rd 2017, 21:42:00.000 | 3060 | 7 | 69 | 303 | 0 | 46 | 0 | 1146 | 1482 | 17 | 25 |
| D | March 23rd 2017, 21:42:00.000 | 23310 | 59 | 96 | 178 | 0 | 90 | 0 | 7212944 | 5779460 | 41185 | 44714 |
| A | March 23rd 2017, 21:47:00.000 | 830 | 50 | 49 | 71 | 0 | 60 | 0 | 1684 | 34795 | 29 | 367 |
| E | March 23rd 2017, 21:47:00.000 | 92187 | 49 | 76 | 22 | 0 | 18 | 0 | 138 | 331 | 7 | 17 |

| INSTANCE ID | | 1st DECILE | 2nd DECILE | 4st DECILE | MEDIAN | MEAN | 6th DECILE | 7th DECILE | 8th DECILE | 9th DECILE | 95th PERCENTILE | 99th PERCENTILE | STANDARD DEVIATION |
|---|---|---|---|---|---|---|---|---|---|---|---|---|---|
| A | CPU TIME | | | | | | | | | | | | |
| A | NETWORK TRANSMITTED PACKETS | | | | | | | | | | | | |
| A | MEM UNUSED | | | | | | | | | | | | |

FIG. 3C

| INSTANCE ID | CPU TIME 1st DECILE | CPU TIME STANDARD DEVIATION | ... | NETWORK TRANSMITTED PACKETS 1st DECILE | NETWORK TRANSMITTED PACKETS STANDARD DEVIATION | ... | MEM UNUSED 1st DECILE | MEM UNUSED STANDARD DEVIATION |
|---|---|---|---|---|---|---|---|---|
| A | | | | | | | | |

FIG. 4

| INSTANCE ID | CPU TIME 1st DECILE | ... | CPU TIME STANDARD DEVIATION | NETWORK TRANSMITTED PACKETS 1st DECILE | ... | NETWORK TRANSMITTED PACKETS STANDARD DEVIATION | MEM UNUSED 1st DECILE | ... | MEM UNUSED STANDARD DEVIATION | LABEL |
|---|---|---|---|---|---|---|---|---|---|---|
| A | | | | | | | | | | IDLE |
| B | | | | | | | | | | ACTIVE |
| C | | | | | | | | | | ACTIVE ← L1 |
| D | | | | | | | | | | ACTIVE |
| E | | | | | | | | | | IDLE |

| INSTANCE ID | LABEL | IS BASELINE | CPU | MEM | DISK | NETWORK |
|---|---|---|---|---|---|---|
| A | IDLE | YES | | | | |
| B | UNKNOWN | NO | | | | |
| C | UNKNOWN | NO | | | | |
| D | UNKNOWN | NO | | | | |
| E | UNKNOWN | YES | | | | |

FIG. 8B
L32

| INSTANCE ID | LABEL | IS BASELINE | CPU | MEM | DISK | NETWORK |
|---|---|---|---|---|---|---|
| A | IDLE | YES | LOG(VALUE) | | | |
| B | UNKNOWN | NO | | | | |
| C | UNKNOWN | NO | | | | |
| D | UNKNOWN | NO | | | | |
| E | UNKNOWN | YES | | | | |

FIG. 8C
L33

| INSTANCE ID | LABEL | IS BASELINE | CPU | MEM | DISK | NETWORK |
|---|---|---|---|---|---|---|
| A | IDLE | YES | (VALUE−AVG) / STDEV | | | |
| B | UNKNOWN | NO | | | | |
| C | UNKNOWN | NO | | | | |
| D | UNKNOWN | NO | | | | |
| E | UNKNOWN | YES | | | | |
| | | | | | | |

FIG. 8D
L34

| INSTANCE ID | LABEL | IS BASELINE | CPU | MEM | DISK | NETWORK |
|---|---|---|---|---|---|---|
| A | IDLE | YES | | | | |
| B | UNKNOWN | NO | | | | |
| C | UNKNOWN | NO | | | | |
| D | UNKNOWN | NO | | | | |
| E | UNKNOWN | YES | | | | |
| BASELINE CENTROID | / | / | AVG(BASELINE=YES) | AVG(IS BASELINE=YES) | AVG(IS BASELINE=YES) | AVG(IS BASELINE=YES) |

FIG. 8E

| INSTANCE ID | LABEL | IS BASELINE | CPU | MEM | DISK | NETWORK | DISTANCE FROM CENTROID |
|---|---|---|---|---|---|---|---|
| A | IDLE | YES | | | | | / |
| B | UNKNOWN | NO | | | | | SQRT(SUM(VALUE−AVG(VALUE OF BASELINE CENTROID))^2) |
| C | UNKNOWN | NO | | | | | |
| D | UNKNOWN | NO | | | | | |
| E | UNKNOWN | YES | | | | | / |
| BASELINE CENTROID | / | / | AVG (BASELINE =YES) | AVG(IS BASELINE =YES) | AVG(IS BASELINE =YES) | AVG(IS BASELINE =YES) | |

| INSTANCE ID | LABEL | IS BASELINE | CPU | MEM | DISK | NETWORK | DISTANCE FROM CENTROID | RANK |
|---|---|---|---|---|---|---|---|---|
| A | IDLE | YES | | | | | SQRT(SUM(VALUE−AVG(VALUE OF BASELINE CENTROID))^2) | |
| B | UNKNOWN | NO | | | | | | |
| C | UNKNOWN | NO | | | | | | |
| D | UNKNOWN | NO | | | | | | |
| E | UNKNOWN | YES | | | | | | |
| BASELINE CENTROID | / | / | AVG (BASELINE =YES) | AVG(IS BASELINE =YES) | AVG(IS BASELINE =YES) | AVG(IS BASELINE =YES) | 0 | |

| INSTANCE ID | LABEL | IS BASELINE | CPU | MEM | DISK | NETWORK | LOG RANK | SCALE RANK | ADDITIVE RANK (LOG RANK + SCALE RANK) |
|---|---|---|---|---|---|---|---|---|---|
| A | IDLE | YES | | | | | | | |
| B | UNKNOWN | NO | | | | | | | |
| C | UNKNOWN | NO | | | | | | | |
| D | UNKNOWN | NO | | | | | | | |
| E | UNKNOWN | YES | | | | | | | |

↗ L37

INSTANCE USAGE FACILITATING SYSTEM

CROSS-REFERENCE TO RELATED APPLICATION

The present application claims priority from Japanese application JP 2017-222764, filed on Nov. 20, 2017, the contents of which is hereby incorporated by reference into this application.

BACKGROUND

The present invention relates to an instance usage facilitating system.

In cloud computing which utilizes computer resources existing across a network and causes them to execute a large variety of computation, a large number of computer resources are sometimes allocated to some users. Some of these computer resources appear not to be used actually, even though only allocated.

In this situation, when a lot of users want to use computer resources, because such a large number of resources have already been allocated, though available resources exist, a shortage of resources that can be used may occur consequently and computation may not be performed efficiently.

In order to avoid a shortage of instances as computer resources in such a situation, a technical approach outlined below is proposed: after machine learning of, e.g., a mapping relation between metrics acquired from respective instances existing across a network and actual operating status of the instances, as teacher data, is carried out, by estimating the operating status of each instance using a machine learning method by which the foregoing learning has been done, the technical approach facilitates reuse of idle instances (refer to, e.g., Kee Kim, et al., 2006, A Supervised Learning Model for Identifying Inactive VMs in Private Cloud Data Centers. In Proceedings of the Industrial Track of the 17th International Middleware Conference (Middleware Industry '16). ACM.).

According to this technical approach, after sufficient machine learning is carried out, it is possible to find an idle instance from among plural instances with a high degree of accuracy and make the idle instance usable again and it is expected to avoid a shortage of instances in totality.

SUMMARY

Now, when the technical approach noted above is used, it is necessary that machine learning is carried out sufficiently beforehand to classify the operating status of instances with a high degree of accuracy. To carry out such machine learning, it is prerequisite that a sufficient number of teacher data (labels) for use in training exists in advance.

However, given that the hitherto known technical approach as noted above is used, it is difficult to prepare in advance labels on the scale of cloud computing and it is difficult on a realistic level to request all users to provide information to be used for labeling. Therefore, only introducing a machine learning method does not make it possible to detect idle instances with a high degree of accuracy and, consequently, it is hard to make unused instances usable early and certainly.

The present invention has been developed based on circumstances as noted above and an object of the invention resides in providing an instance usage facilitating system that enables it to find an idle instance and make the instance usable promptly and certainly even in a situation where there is no sufficiency of teacher data (labels) for machine learning.

The present invention concerns aspects as follows:

(1) An instance usage facilitating system that detects an idle instance from among a plurality of instances for use in a cloud infrastructure and makes the idle instance usable, the instance usage facilitating system including:

a metrics acquisition unit which acquires metrics of respective instances from the plurality of instances;

an instance selecting unit which selects an instance whose operating status should be inquired from among instances whose operating status is unknown among the plurality of instances;

an inquiry unit which makes an inquiry of a user about the operating status of an instance selected by the instance selecting unit and attaches a label indicating any of active, idle, and unknown statuses to the instance, based on a result of the inquiry;

an instance usage enabling unit which enables usage of an instance with an idle status label attached thereto among instances labeled by the inquiry unit; and a machine learning unit which performs machine learning to determine the operating status of a new instance, using the metrics of respective instances acquired by the metrics acquisition unit and the labels of the respective instances attached by the inquiry unit.

(2) The instance usage facilitating system, as set forth in (1), wherein selecting an instance by the instance selecting unit, making an inquiry to a user and instance labeling by the inquiry unit, and enabling instance usage by the instance usage enabling unit are iteratively executed.

(3) The instance usage facilitating system, as set forth in (1) or (2), wherein the instance selecting unit selects an instance whose operating status should be inquired, using a heuristic algorithm.

(4) The instance usage facilitating system, as set forth in (3), wherein the heuristic algorithm is a combination of an algorithm using log transformation and an algorithm using scale transformation.

(5) The instance usage facilitating system, as set forth in any one of (1) thru (4), wherein the instance usage facilitating system is used under a multi-tenant cloud environment.

(6) The instance usage facilitating system, as set forth in any one of (1) thru (5), wherein the inquiry unit makes an inquiry about the operating status of an instance via a chatbot interface.

Now, "instances" mentioned herein means virtual computers (virtual machines (VMs)) which are built by software and activated on physical computers (physical servers). A "multi-tenant cloud environment" means a cloud computing environment including equipment, software, databases, etc. to be shared by plural companies (organizations). A "chatbot interface" means a simple man-machine interface that automatically sends an inquiry from the inquiry unit to a user and receives a reply from the user.

The present invention can provide an instance usage facilitating system that enables it to find an idle instance and make the instance usable promptly and certainly even in a situation where there is no sufficiency of teacher data (labels) for machine learning.

DETAILED DESCRIPTION

An instance usage facilitating system of the present invention is the instance usage facilitating system that detects an idle instance from among plural instances for use in a cloud infrastructure and makes the idle instance usable. The instance usage facilitating system is characterized by including a metrics acquisition unit which acquires metrics of respective instances from the plural instances; an instance selecting unit which selects an instance whose operating status should be inquired from among instances whose operating status is unknown among the plural instances; an inquiry unit which makes an inquiry of a user about the operating status of an instance selected by the instance selecting unit and attaches a label indicating any of active, idle, and unknown statuses to the instance, based on a result of the inquiry; an instance usage enabling unit which enables usage of an instance with an idle status label attached thereto among instances labeled by the inquiry unit; and a machine learning unit which performs machine learning to determine the operating status of a new instance, using the metrics of respective instances acquired by the metrics acquisition unit and the labels of the respective instances attached by the inquiry unit.

Figure 1:
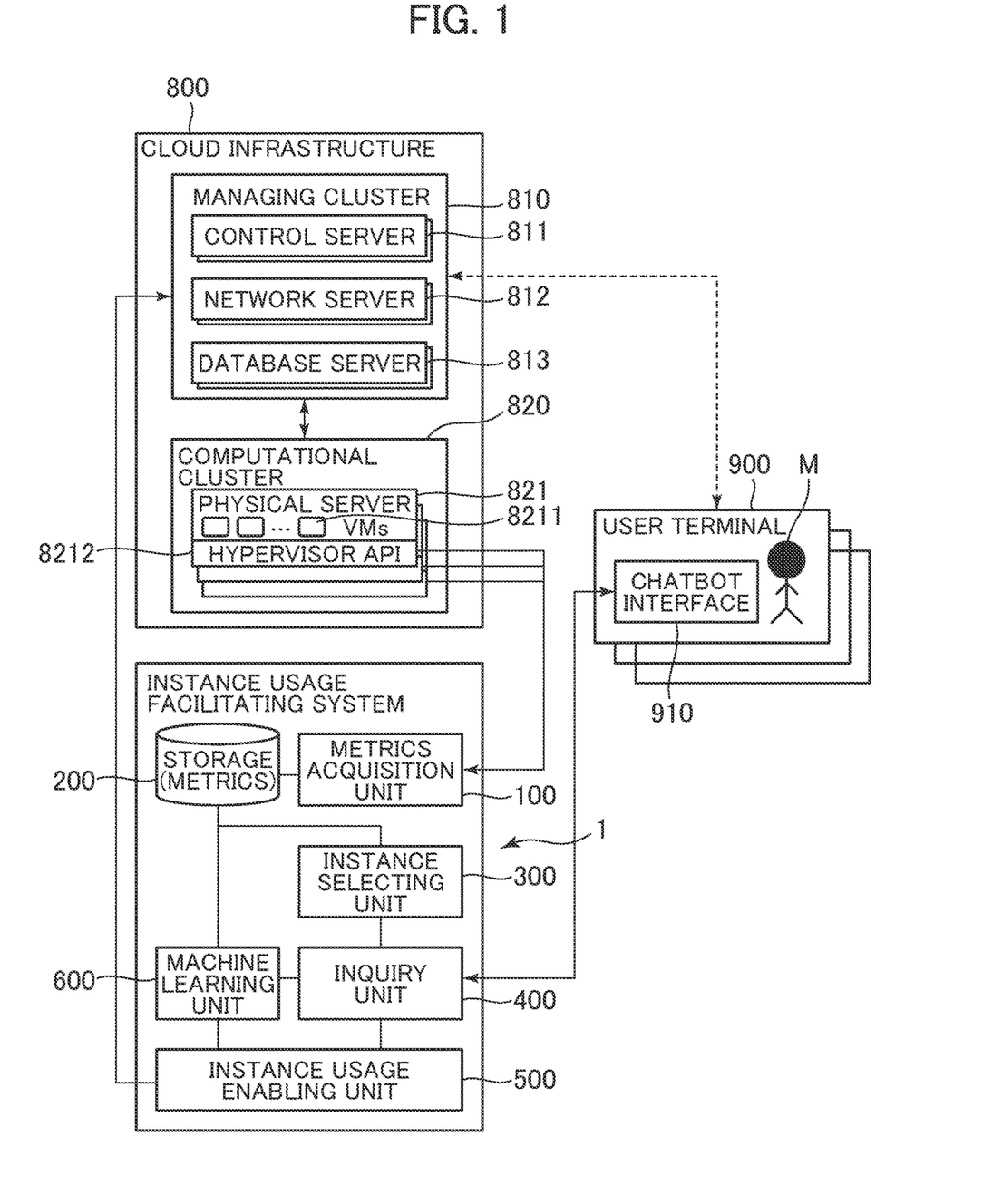
FIG. 1 is an overview block diagram depicting one embodiment of the present invention.

The instance usage facilitating system 1 is applied to, inter alia, a cloud environment where a cloud infrastructure 800 is build, as depicted in FIG. 1, where, for example, a user M may connect to an Infrastructure as a Service (IaaS) via a user terminal 900 and get access to an instance (a virtual machine 8211) in a physical server 821 through a hypervisor API 8212, thereby allowing the user to use the instance.

In the following, one embodiment of the present invention will be described with reference to the drawings; however, the present invention should not be construed to be limited to the embodiment whose details are depicted in the drawings.

FIG. 1 is an overview block diagram depicting one embodiment of the present invention. As depicted in FIG. 1, the instance usage facilitating system 1 is generally comprised of a metrics acquisition unit 100, storage 200, an instance selecting unit 300, an inquiry unit 400, an instance usage enabling unit 500, and a machine learning unit 600.

The metrics acquisition unit 100 acquires metrics (e.g., CPU occupation time, unused memory, amounts of packets for communication, etc.) from plural instances. In particular, from respective instances (virtual machines) 8211) in physical servers 821 in a computational cluster 820, e.g., as depicted in FIG. 1, the metrics acquisition unit 100 acquires the metrics of respective instances via the API (Application Program Interface) 8212 and stores the thus acquired metrics into the storage 200. Now, timing to acquire metrics information may be either periodic (at intervals of five minutes or other period of time) or non-period; however, it is preferable that the timing should be determined to allow an inquiry to be performed by the inquiry unit 400, which will be described later, during an interval.

Figure 2:
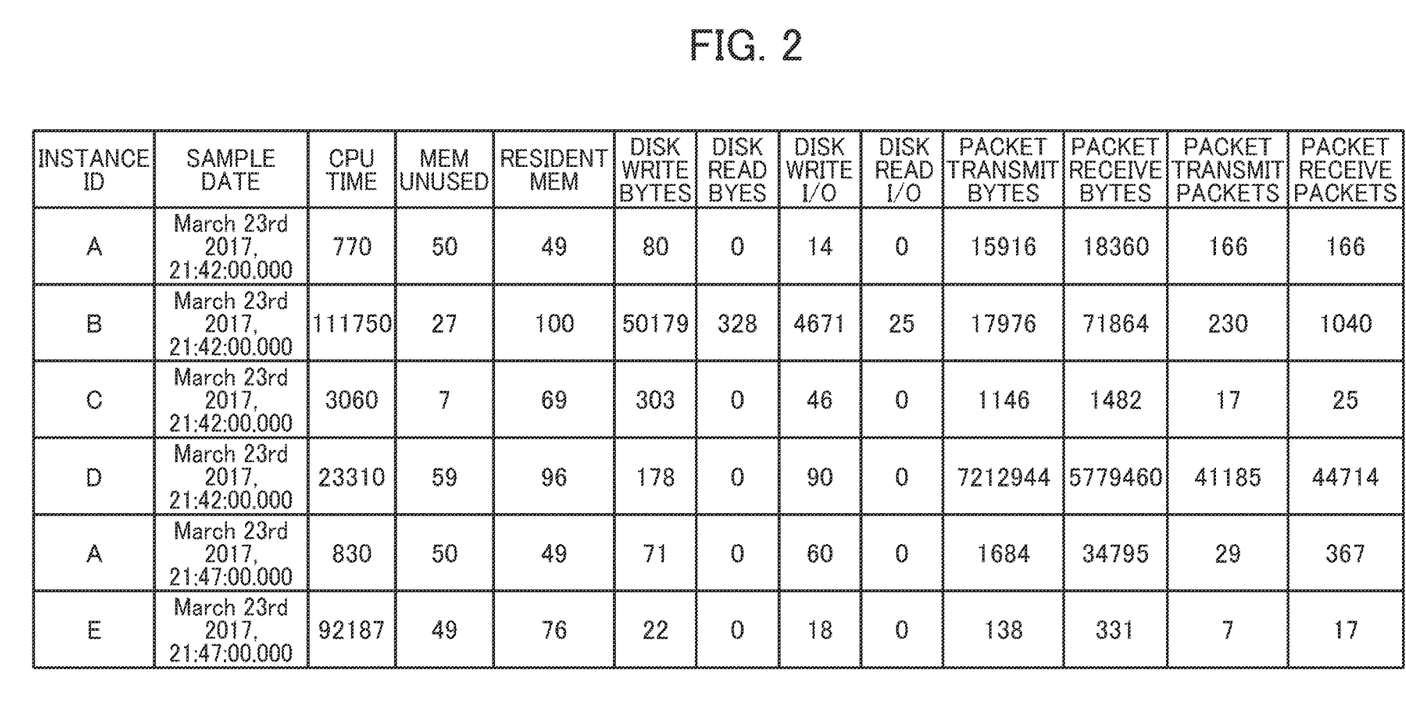
FIG. 2 is a diagram in a summary form representing one example of metrics information acquired by the system in FIG. 1.

Now, FIG. 2 is a diagram in a summary form representing one example of metrics information acquired by the system in FIG. 1. Plural instances are assigned an instance ID to identify each instance and the metrics information is associated with this instance ID. Now, when operation of an instance halts or stops, no metrics information is issued from the instance during the halt or the like.

The instance selecting unit 300 selects an instance whose operating status should be inquired from among instances whose operating status is unknown among the plural instances. Instances that may be selected by the instance selecting unit 300 are typically a subset of the instances whose operating status is unknown from a perspective of reducing the load of the inquiry unit 400 in performing an inquiry operation; however, those instances may be all of the instances whose operating status is unknown.

As for a way in which the instance selecting unit 300 selects an instance, it is preferable to select an instance whose operating status should be inquired, using a heuristic algorithm to which no limitation is intended. Particular examples of the heuristic algorithm are an algorithm with log transformation, an algorithm with scale conversion, an algorithm combining the algorithm with log transformation and the algorithm with scale transformation, etc. Among these, the algorithm combining the algorithm with log transformation and the algorithm with scale transformation, which will be described later, is preferable as the heuristic algorithm.

As described above, the instance selecting unit 300 uses a heuristic algorithm in selecting an instance. This enables the instance usage facilitating system 1 to promptly select an instance that is likely to be idle from among instances whose operating status is unknown. Particularly, use of the algorithm combining the algorithm with log transformation and the algorithm with scale transformation as the heuristic algorithm allows for selecting an a comparatively high ranked algorithm in each algorithm; therefore, it is possible to make an selection using the heuristic algorithm more accurately.

Figure 4:
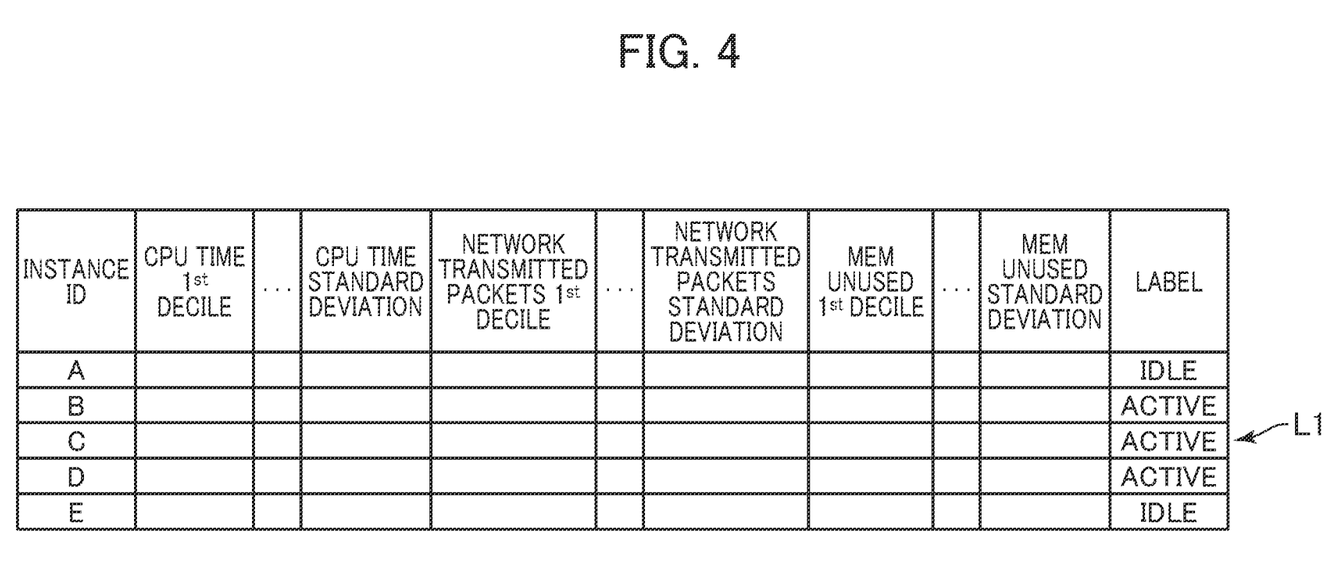
FIG. 4 is a diagram in a summary form representing one example of derived data, as presented in FIG. 3C, associated with labels.

The inquiry unit 400 makes an inquiry of a user M about the operating status of an instance selected by the instance selecting unit 300 and attaches a label indicating any of active, idle, and unknown statuses to the instance, based on a result of the inquiry. In particular, the inquiry unit 400 is equipped with, e.g., a user notification module 410 which transmits an inquiry about usage status of instances maintained by the user to a user terminal 900 and receives an answer to the inquiry from the user terminal 900, registers the answer obtained from the user by this inquiry into a list L1 as teacher data (labels), and stores this data in association with metrics information for each instance into the storage 200 (e.g., see FIG. 4).

Now, it is preferable that, via the chatbot interface 910 that a user terminal 900 has, the inquiry unit 400 makes an inquiry of the user M about the operating status of an instance that is subject to inquiry. As the chatbot interface 910, e.g., a publicly known chatbot interface or the like can be used. This enables it to make an inquiry about the operating status of an instance efficiently without consuming time.

Now, particular examples of a label indicating the operating status of an instance are a label (idle) indicating a true idle status, a label (active) indicating a non-idle status I, and a label (unknown) indicating that no answer is obtained from the user, etc.

The instance usage enabling unit 500 enables usage of an instance with an idle status label (idle) attached thereto among instances labeled by the inquiry unit 400. In particular, the instance usage enabling unit 500, for example, transmits instance ID information of an instance with an idle status label attached thereto to a managing cluster 810 in the cloud infrastructure 800. Then, the relevant instance (virtual machine 8211) in a physical server 821 is made free via a control server 811 in the managing cluster, thus making it transit into a newly usable status.

The machine learning unit 600 performs machine learning to determine the operating status of a new instance (whose operating status is unknown), using the metrics of respective instances acquired by the metrics acquisition unit 100 and the labels of the respective instances attached by the inquiry unit 400. A way of learning that is performed by the machine learning unit 600 is non-limiting; for example, a publicly known technique or the like, such as deep machine learning can be used.

Figure 6:
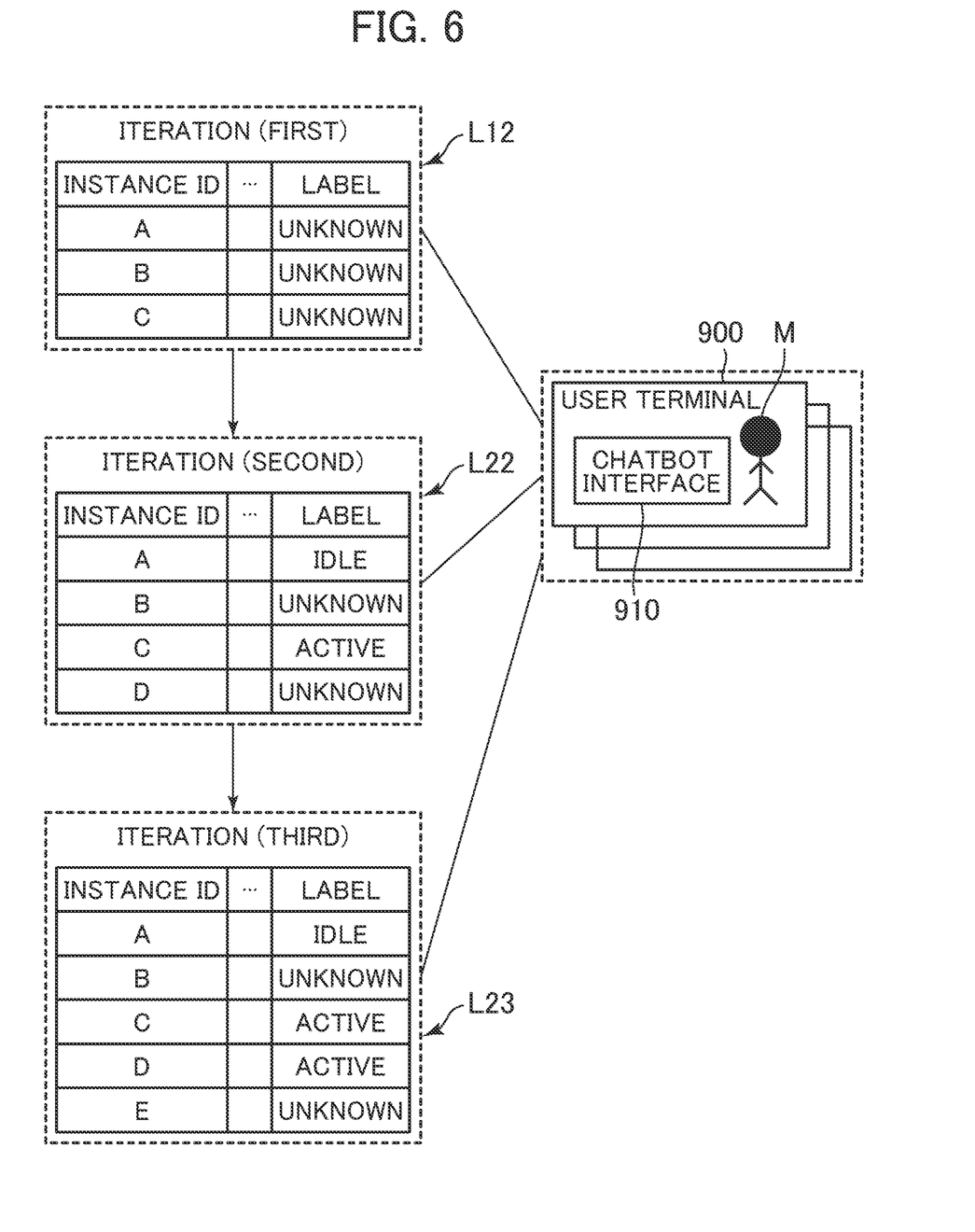
FIG. 6 is a diagram in a summary form representing examples of lists obtained by iteration of the processing flow, as illustrated in FIG. 5.

Here, it is preferable that the instance usage facilitating system 1 is a system in which the following are iteratively executed: selecting an instance by the instance selecting unit 300, making an inquiry to a user M and instance labeling by the inquiry unit 400, and enabling instance usage by the instance usage enabling unit 500. In particular, using an original list (see a list L21 at "iteration (first)" in FIG. 6) in which, for example, the operating statuses of instances A, B, and C are registered, the instance usage facilitating system 1 performs processing to update the original list L21 by updating the operating statuses based on results of inquiries about the "unknown" instances A, B, and C and adding an "unknown" instance D newly selected by the instance selecting unit 300 (see a list L22 at "iteration (second)" in FIG. 6); then, the system updates the list 22 by performing similar processing successively (see a list L23 at "iteration (third)" in FIG. 6). Now, the above iteration can be performed successively, though not depicted.

By configuring the system such that the instance selecting unit 300 and other units perform processing iteratively, the number of instances whose operating status is known can be increased gradually and it is possible to make unknown instances usable more efficiently, while restraining the load of inquiry (and the load on users M inquired).

Now, each processing that is performed by the metrics acquisition unit 100, instance selecting unit 300, inquiry unit 400, instance usage enabling unit 500, and machine learning unit 600, as described above, can be implemented in such a way that hardware, which is not depicted, including a central processing unit (CPU), a memory, and a storage device as well as a bus or the like interconnecting them is used and a predefined computer program is run on the hardware.

Figure 3A:
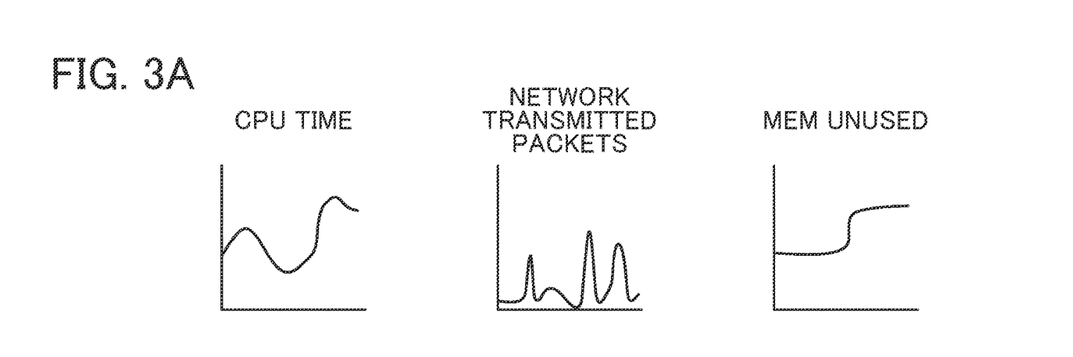
FIG. 3A is a diagram in a summary form representing one example of metrics sorted by instance based on the metrics information as presented in FIG. 2.
Figures 3B, 3C:
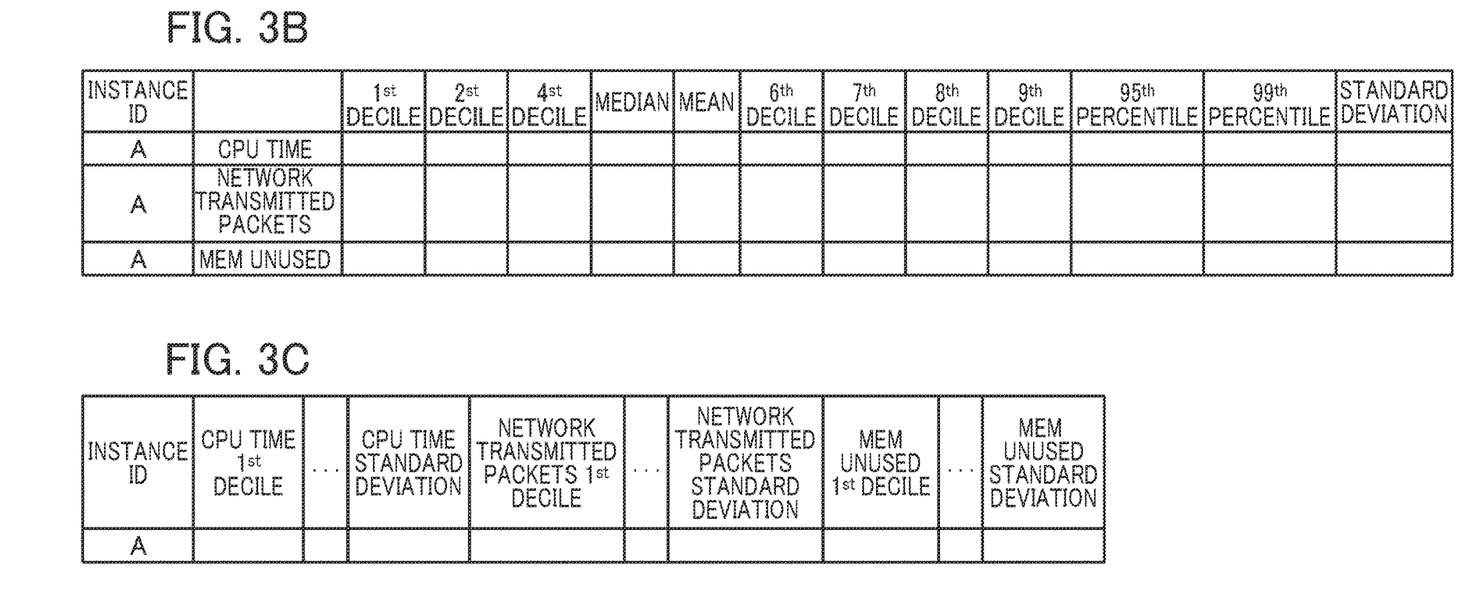
FIG. 3B is a diagram in a summary form representing one example of metrics sorted by instance based on the metrics information as presented in FIG. 2.
FIG. 3C is a diagram in a summary form representing one example of derived data to which metrics information in FIG. 3B is converted.
Figure 5:
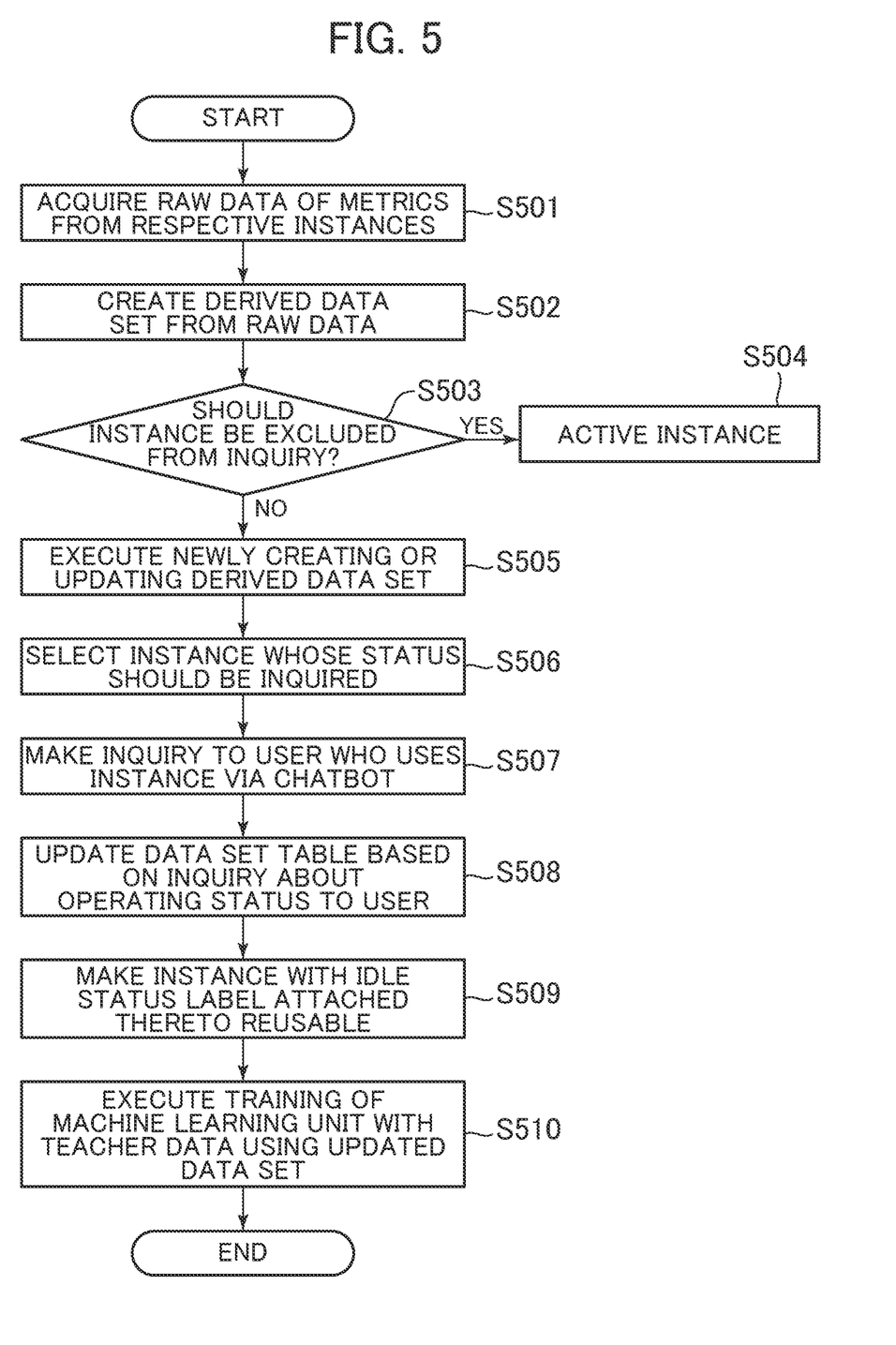
FIG. 5 is a block diagram in a summary form illustrating a processing flow in relation to FIG. 1.

Then, descriptions are provided about one example of a processing flow using the instance usage facilitating system 1. FIG. 5 is a block diagram in a summary form illustrating the processing flow of the instance usage facilitating system 1. In the instance usage facilitating system 1, as illustrated in FIG. 5, first, the metrics acquisition unit 100 acquires instance's metrics information (raw data) from respective instances periodically or non-periodically (step S501). The above raw data, for example, includes time-series data of CPU operating time, amounts of packets for communication, unused memory amount, etc. at acquisition time (time stamp), acquired for instances which are identified by an instance ID (see FIG. 2, FIG. 3A, and FIG. 3B).

Next, the metrics acquisition unit 100 converts the metrics information (raw data) collected at step S501 to derived data (step S502). The derived data is comprised of a data set of a series of metrics collected for one instance which is identified by an instance ID and includes metrics acquired at all times. This derived data constitutes one entry for each instance and each entry is registered into a list.

Next, the instance selecting unit 300 determines to exclude an instance whose operating status should be inquired among instances for which derived data is created (step S503) and deselects the instance determined to be excluded (step S504). A particular example of this instance that is deselected by the instance selecting unit 300 is an instance with a label (active) attached thereto indicating a non-idle status.

Next, the metrics acquisition unit 100 stores the derived data on instances other than the instance(s) excluded at step S503 into the storage 200 as new data or updated data (step S505).

Next, the instance selecting unit 300 selects an instance whose operation status should be inquired (step S506). A way of selection that is used in this step is, for example, a heuristic algorithm or the like, such as an algorithm combining a log function and a scale function, which will be described later.

Next, the inquiry unit 400 makes an inquiry of a user M about the operating status of the instance selected by the instance selecting unit 300 via, e.g., the chatbot interface 910 (step S507). Then, an answer from the user M is classified with any of a true idle status, a non-idle status, and no answer and, based on the above answer, the inquiry unit 400 newly registers a label into a list L1 as presented in FIG. 4 or updates the contents of the list (step S508).

Next, the instance usage enabling unit 500 performs processing to enable it to reuse an instance to which an idle status label is attached by the inquiry unit 400 (step S509). In particular, the instance usage enabling unit 500, for example, transmits an instance ID and a signal indicating that the instance with this instance ID is reusable to a control server 811 in the managing cluster 810 presented in FIG. 1 and the above instance is made reusable via the control server 811, a network server 812, a database server 813, etc.

Next, the machine learning unit 600 performs machine learning to determine the operating status of a new instance, using the metrics of respective instances acquired previously and the labels attached to the instances (step S510). Next, after the execution of step S510, a return is made to step S501, as required, and the foregoing steps S501 to S510 are executed iteratively.

Figure 7:
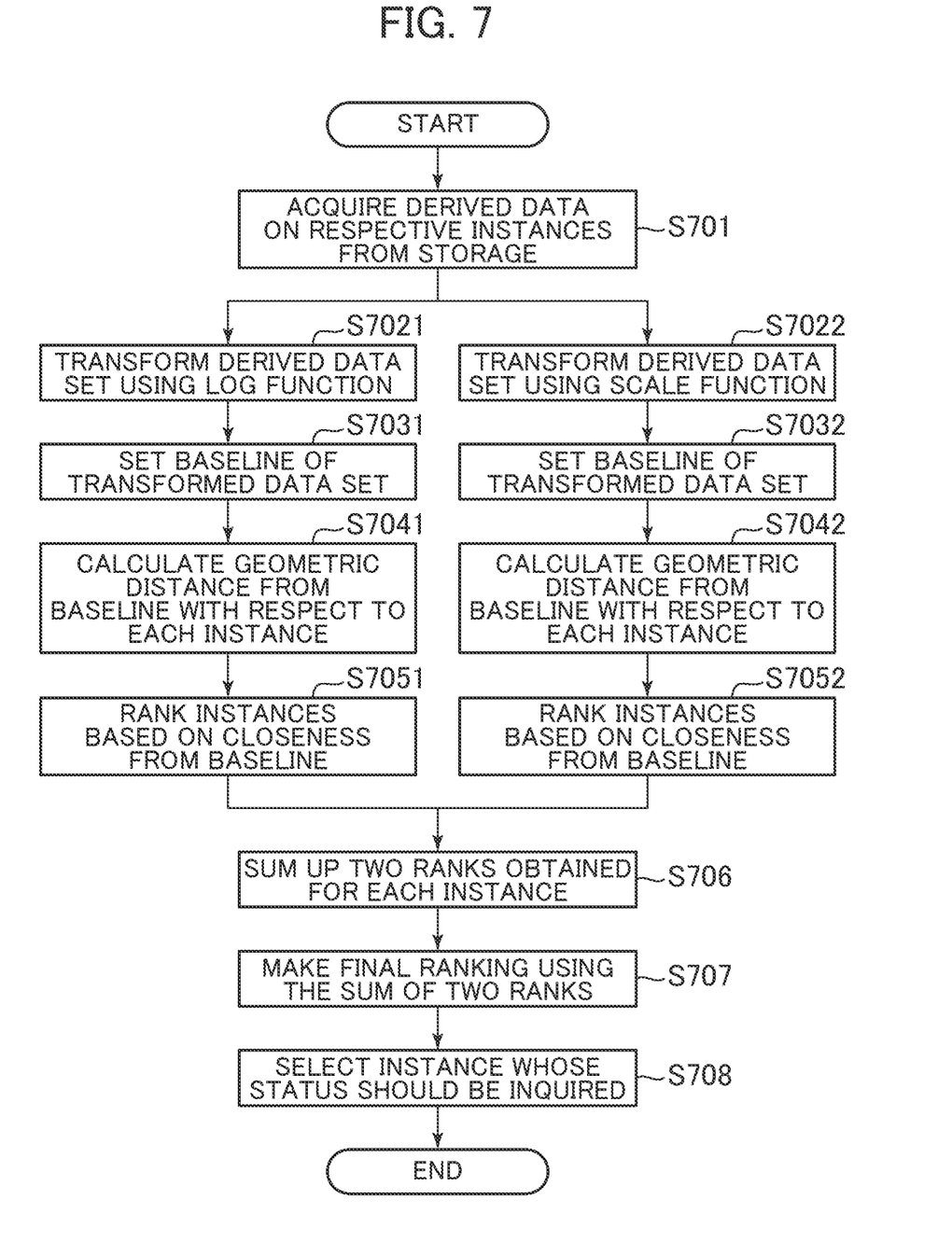
FIG. 7 is a flowchart in a summary form illustrating one example of instance selection processing that is performed by the instance selecting unit, as presented in FIG. 1.
Figure 8A:
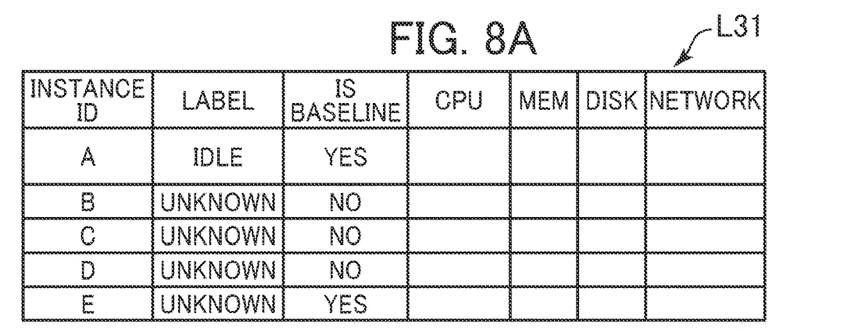
FIG. 8A is a diagram in a summary form representing a concrete example of processing performed by the instance selecting unit, the diagram presenting one example of a list.
Figure 8B:
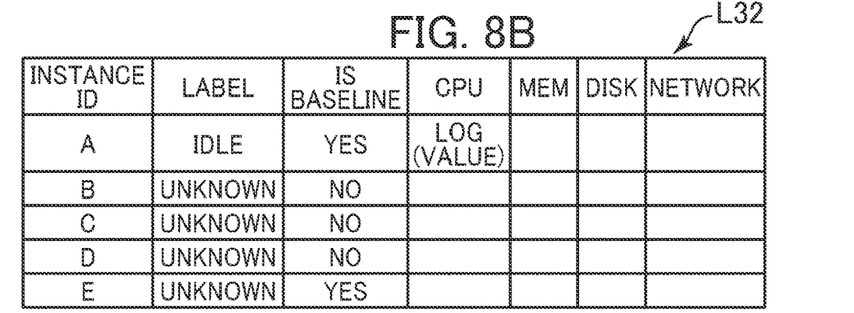
FIG. 8B is a diagram in a summary form representing a concrete example of processing performed by the instance selecting unit, the diagram presenting one example of a list.
Figure 8C:
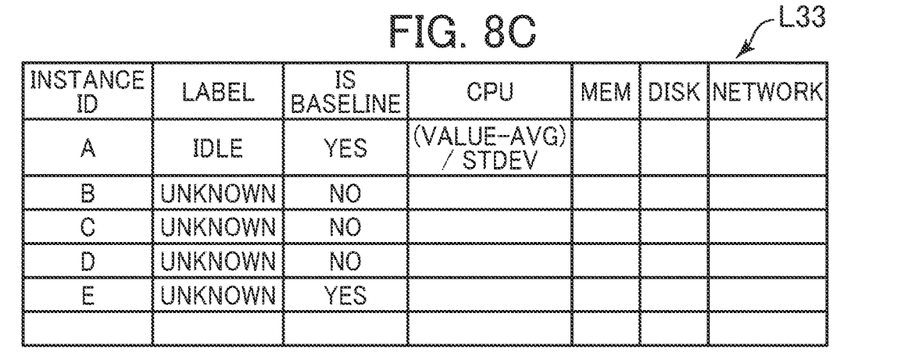
FIG. 8C is a diagram in a summary form representing a concrete example of processing performed by the instance selecting unit, the diagram presenting one example of a list.
Figure 8D:
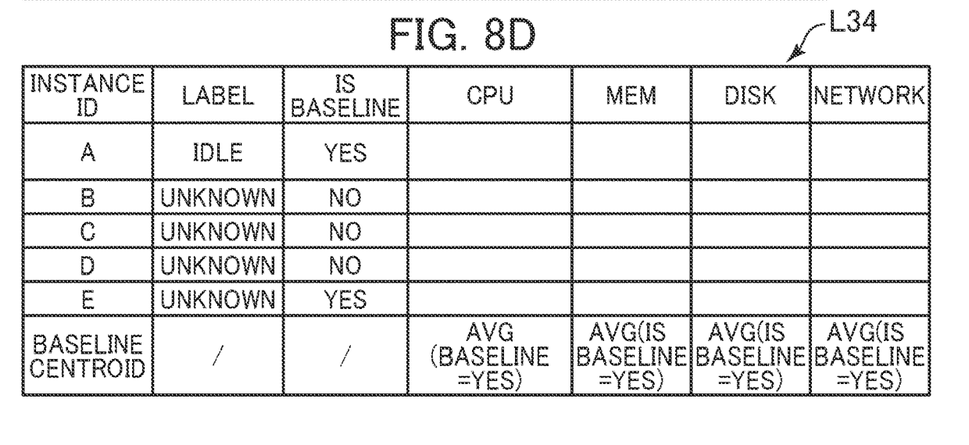
FIG. 8D is a diagram in a summary form representing a concrete example of processing performed by the instance selecting unit, the diagram presenting one example of a list.
Figure 8E:
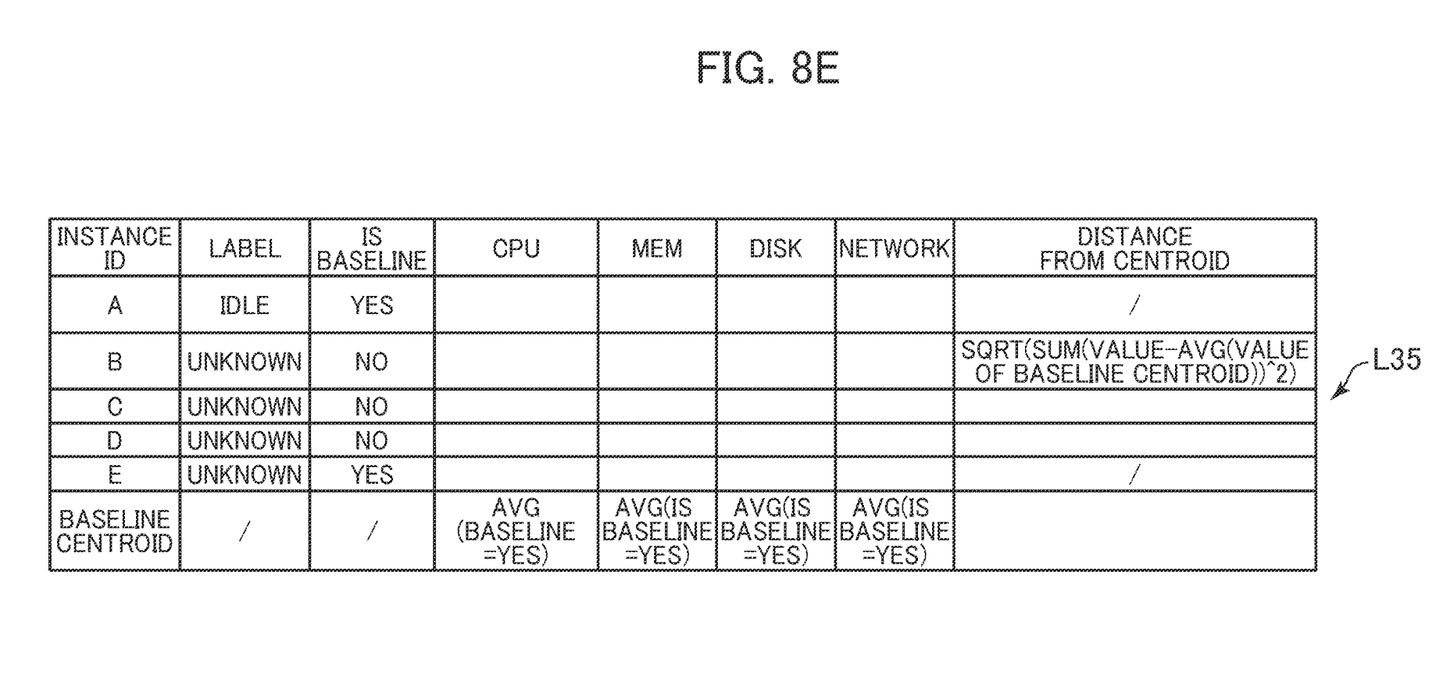
FIG. 8E is a diagram in a summary form representing a concrete example of processing performed by the instance selecting unit, the diagram presenting one example of a list.
Figure 8F:
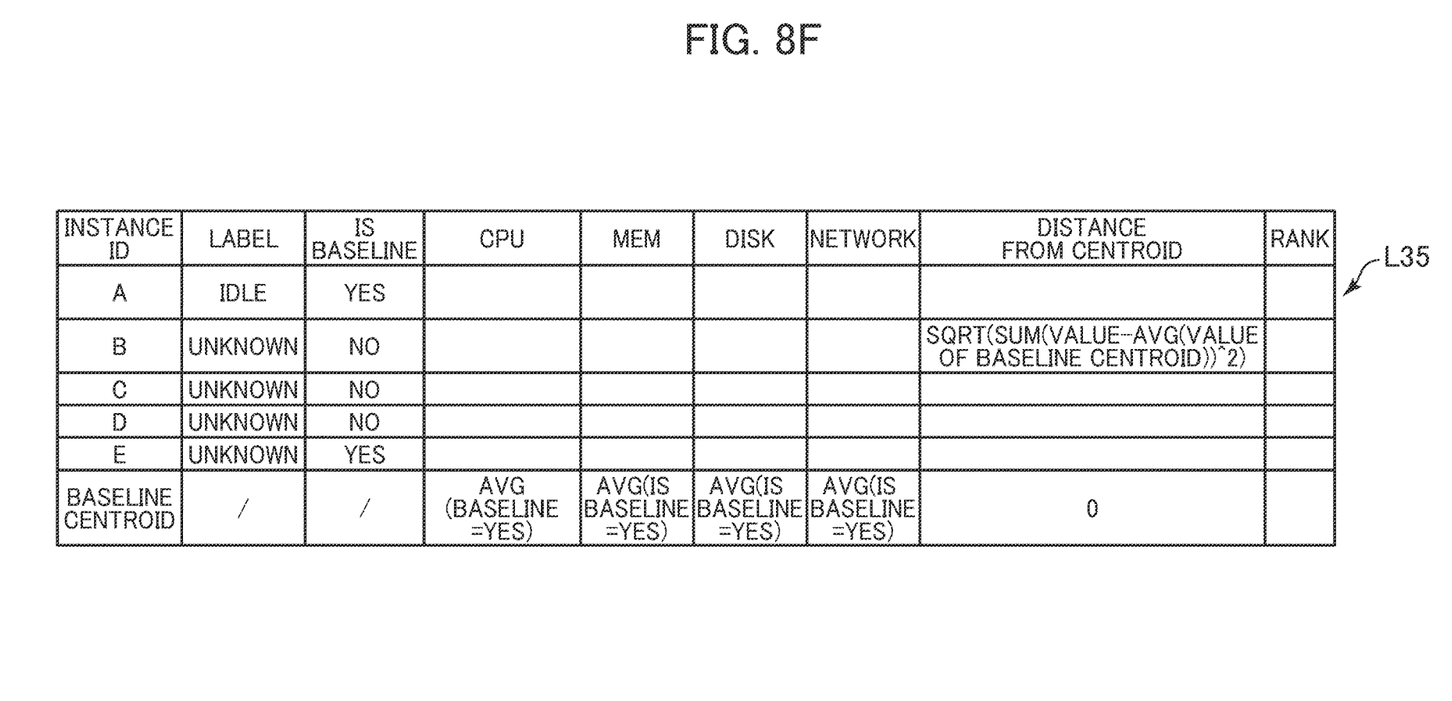
FIG. 8F is a diagram in a summary form representing a concrete example of processing performed by the instance selecting unit, the diagram presenting one example of a list.
Figure 8G:
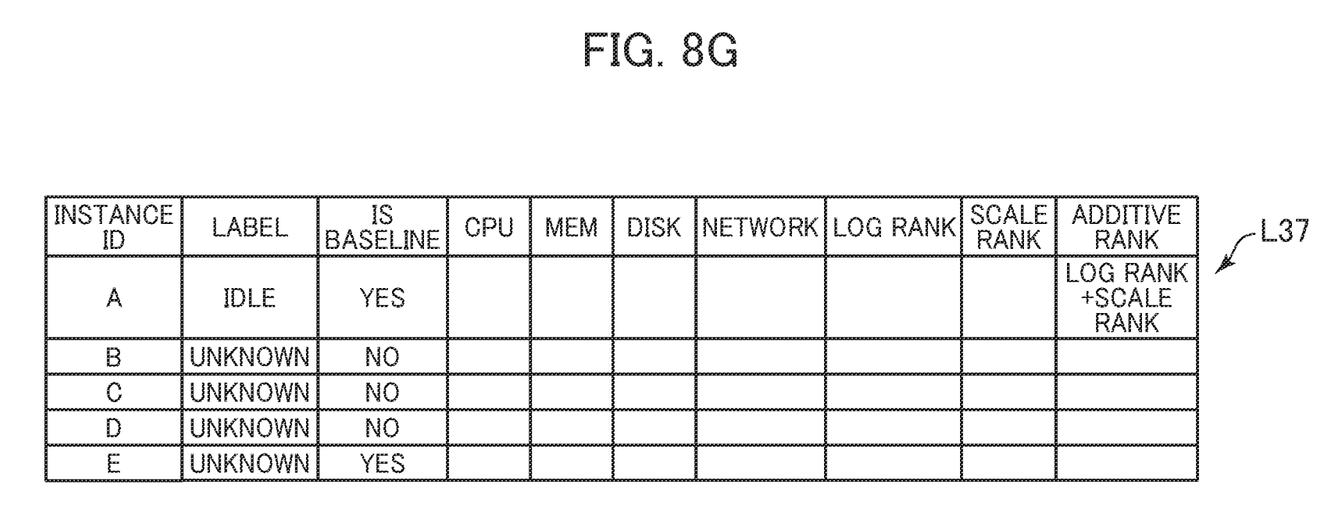
FIG. 8G is a diagram in a summary form representing a concrete example of processing performed by the instance selecting unit, the diagram presenting one example of a list.

Then, descriptions are provided in greater detail as to an instance selection that is made by the instance selecting unit 300, described previously, taking a heuristic algorithm combining an algorithm using log transformation and an algorithm using scale transformation as an example. FIG. 7 is a flowchart in a summary form illustrating one example of instance selection processing that is performed by the instance selecting unit 300 of the instance usage facilitating system 1. FIGS. 8A to 8G are diagrams in a summary form representing a concrete example of the above processing.

The present algorithm first acquires a list L31 in which derived data on respective instances is registered from the storage 200 (step S701). Then, using the acquired list L31, the algorithm performs a log transformation of data in this list L31 (in particular, applying a "loglp" function) (see a list L32 in FIG. 8B) (step S7021) and, besides, performs a scale transformation of the above derived data (the transformation is made by centering respective values so that their average value will be a median and dividing them by standard deviation) (see a list L33 in FIG. 8C) (step S7022).

Next, the algorithm calculates average values of metrics with regard to a baseline instance that has been set in an idle status intentionally by a cloud administrator (see a list L34 in FIG. 8D) (step S7031). After that, the algorithm calculates a geometric distance of the metrics on the respective instances from the above average values (see a list L35 in FIG. 8E) (step S7041). Next, based on this geometric distance, the algorithm ranks each one of the derived data based on the foregoing log transformation (see a list L36 in FIG. 8F) (step S7051). Now, because steps S7032, S7042, and S7052 with regard to scale transformation in FIG. 7 are the same as the above-described steps S7031, S7041, and S7051, their description and reference to the figures are omitted.

Next, the algorithm sums up two ranks by log transformation and scale transformation obtained for each derived data (step S706), determines a final ranking by the resulting sum and registers it (see a list L37 in FIG. 8G), and selects an instance whose status should be inquired, based on this final ranking (step S708).

Now, the more accurate the heuristic algorithm, the higher will be likelihood that a selected instance is idle. In consequence, it is possible to facilitate making instances usable. Now, accuracy is 80% on average when processing in the steps S701 to S708 is repeated several times.

Now, it is preferable that the instance usage facilitating system 1 is used under a multi-tenant cloud environment. So, the use of the instance usage facilitating system 1 under a multi-tenant cloud environment makes it possible to make unused instances usable efficiently even under a variety of cloud environments where, for example, multiple operating systems (OS) that a physical server 821 controls coexist.

In addition, the instance usage facilitating system 1 is applicable to either of a public cloud infrastructure (which is built to make it possible to provide a cloud computing environment which is provided by a cloud provider or the like to many and unspecified users, inter alia, companies (organizations) across the Internet and a private cloud infrastructure (which is built exclusively for a single company (organization) using cloud technology); however, the system is preferably applicable to the private cloud infrastructure, because computational processing within the same company (organization) can be performed more efficiently, if the system is used in the private cloud infrastructure.

As per the foregoing, since the instance usage facilitating system 1 is configured as described hereinbefore, the system enables it to find idle instances and make them usable promptly and certainly even in a situation where there is no sufficiency of teacher data (labels) for machine learning and allows for efficient operation of the cloud structure 800 as a whole.

Now, the present invention is not limited to the configuration of the foregoing embodiment, but is encompassed by the scope of claims, and is intended to include all modifications within the meaning and scope equivalent to the scope of claims.

For instance, while the instance usage facilitating system is described in the foregoing embodiment such that, making an instance usable, which is performed by the instance usage enabling unit 500, is performed for an instance to which an idle status label is attached based on an inquiry made by the inquiry unit 400, an instance usage facilitating system may be such that the above instance usage enabling unit performs making an instance usable based on combination of information on the operating statuses of respective instances obtained by the inquiry unit and information on the operating statuses of respective instances determined using a result of machine learning by the machine learning unit, as described previously.

What is claimed is:

1. An instance usage facilitating system that detects an idle instance from among a plurality of instances for use in a cloud infrastructure and makes the idle instance usable, the instance usage facilitating system comprising:

a memory coupled to a processor, the memory storing instructions that when executed by the processor configure the processor to:

acquire metrics of respective instances from the plurality of instances;

select an instance, whose operating status is to be inquired, from among instances whose operating status is unknown among the plurality of instances based on a combination of a first algorithm using log transformation and a second algorithm using scale transformation, each of the first algorithm and the second algorithm performs processing including:

calculates average values of metrics with respect to a predetermined baseline instance that is in an idle status, calculates a geometric distance of the metrics on the respective instances from the average values, determine a first rank based on each of the metrics based on the processing of the first algorithm and determine a second rank based on the each of the metrics based on the processing of the second algorithm based on the respective geometric distances, sum up the first rank and the second rank, determine a final ranking based on the sum, wherein the instance is selected based on the final raking;

inquire about the operating status of the selected and attach a label indicating a status of any of active, idle, and unknown to the selected instance, based on a result of the inquiry;

enable usage of an instance with an idle status label attached thereto among labeled instances; and perform machine learning to determine the operating status of a new instance, using the metrics of respective instances and the labels of the respective instances.

2. The instance usage facilitating system according to claim 1, wherein the processor is configured to periodically select the instance, inquire about the selected instance, label the instance and enable instance usage.

3. The instance usage facilitating system according to claim 1, wherein the instance usage facilitating system is used under a multi-tenant cloud environment.

4. The instance usage facilitating system according claim 1, wherein the processor is configured to inquire about the selected instance via a chatbot interface.

* * * * *